Patented Jan. 6, 1953

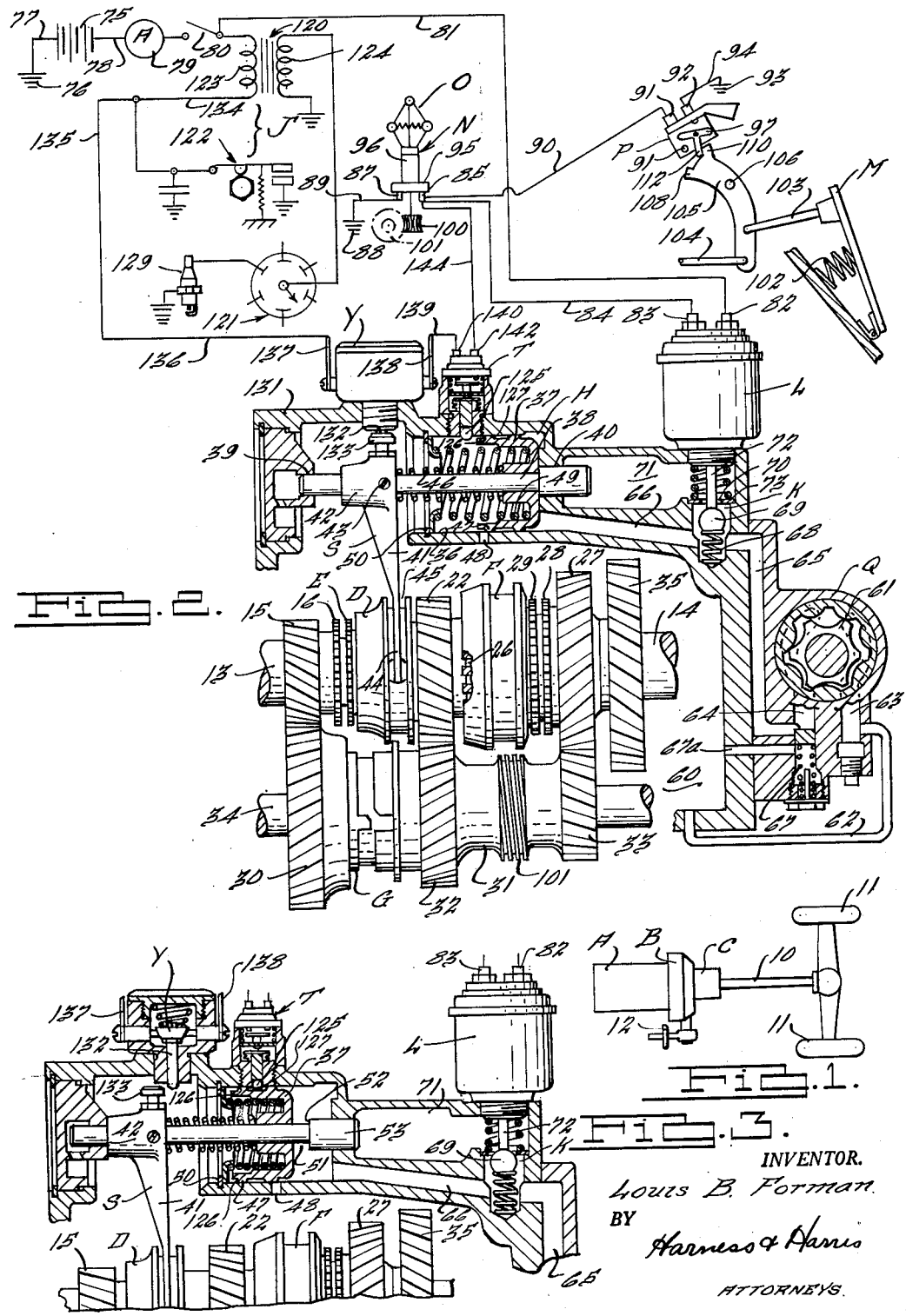

2,624,207

UNITED STATES PATENT OFFICE 2,624,207

TRANSMISSION CONTROL SYSTEM

Louis B. Forman, Detroit, Mich., assignor to Chrysler Corporation, Highland Park, Mich., a corporation of Delaware Application July 24, 1951, Serial No. 238,300

9 Claims. (Cl. 74—472)

This invention relates to motor vehicles and refers more particularly to power transmissions and control systems therefor.

My invention has particular reference to transmission control systems wherein the disengagement of positively engageable drive control elements is facilitated by relieving the torque load on these elements as by momentary interruption of the engine ignition system. Examples of transmissions of this character are described in the patents to Carl A. Neracher et al. 2,455,943, granted December 14, 1948, and Augustin J. Syrovy et al. 2,490,604, granted December 6, 1949.

It has been customary, as shown by the aforesaid patents, to provide a shiftable drive control element of toothed character arranged to interengage with a second toothed drive control element after passing through a toothed blocker. Engagement occurs upon synchronism obtaining between the drive control elements subsequent to engine deceleration by accelerator releasing movement, and the shiftable element is adapted to be unloaded, as described above, to facilitate its disengagement from its companion drive control element.

The drive control elements are generally so arranged in the transmission that upon relative engagement under governor control at or above a predetermined vehicle speed, there is provided a fast speed ratio drive through the transmission, usually a direct drive, and when relatively disengaged under governor control below a predetermined speed, or by kickdown means such as accelerator actuated switch means overruling the governor, there is provided another speed ratio drive which is usually a slower speed ratio drive than the first mentioned one.

Also customarily provided are prime mover or differential pressure servomotor means which may comprise a spring and a hydraulic or vacuum operated motor having a movable piston, for controlling shift of the shiftable drive control element through an associated shift rail or lever system. In the case of the hydraulic system, as typified by the Syrovy et al. patent aforesaid, pressure fluid acting upon the piston will cause it to compress a disengaging spring and an engaging spring, and build up sufficient available force in the latter to move the shift rail and by it the shiftable drive control element against its blocker and then into engagement with its companion drive control element when synchronization of the drive control elements subsequently occurs.

In the case of the vacuum power system, as typified by the Neracher et al. patent, vacuum is utilized to cause the piston to compress a disengaging spring and through a rod extension of the piston, unload an engaging spring previously tensioned by operation of the rod, the latter spring in turn acting upon a lever to effect movement of the shiftable element against its blocker and into subsequent engagement with its companion drive control element when the drive control elements obtain synchronism.

Transmission systems of the aforesaid typical character also usually include electromagnetically controlled valving for controlling venting (admission of atmospheric pressure) of the servomotor and operation of the piston such that when the motor is vented, the disengaging spring actuates the piston to effect disengaging shift of the shiftable drive control element accompanied by ignition interruption, the latter occurring as an incident to available lost motion operation of the piston relative to the shift rail in Syrovy et al., and the piston rod relative to the lever operating member in Neracher et al.

Customarily there is also provided an ignition interrupter switch operated by movement of the piston in Syrovy et al. or by the piston rod in Neracher et al. Moreover, as in the above patents, there is provided an electrical system intended to accommodate interruption of the engine ignition only during the disengaging stroke of the piston, it being so arranged that even though the ignition interruption switch closes on the return (engaging) stroke, the ignition is not ordinarily grounded out because at such time neither of the parallel arranged kickdown and governor switches which are arranged in series with the ignition interrupter switch and in series with the valve solenoid in a parallel circuiting is closed. Hence firing of the engine is not usually interrupted during acceleration from vehicle standstill in the slower speed ratio drive.

As improvements upon the Neracher et al. system of control, it has also been suggested, as shown in the patents to Albert E. Kimberly, Jr. 2,427,408, granted September 16, 1947, and Victor E. Matulaitis 2,291,189, granted July 28, 1942, to arrange the governor and kickdown switches in series with a ground and the valve solenoid and to provide a separate circuit for the ignition interruption control that includes the interrupter switch and means such as an additional switch or mechanical control means intended to render the ignition interrupter switch although actuated, operative to interrupt the ignition in only one direction of movement of the piston rod, whereas in Neracher et al. and Syrovy et al. aforesaid, the ignition interrupter switch is arranged in series with parallel governor and kickdown circuits.

Although the foregoing described arrangements have in general been satisfactory, they have been open to one or more unforseen conditions of operation which it is desirable to avoid in order to provide a foolproof system. Thus in certain of the prior systems it has been possible to obtain ignition interruption while the transmission was in its lower gear, i. e., when the shiftable drive control element is disengaged, but at a time when the vehicle speed was such as to require the governor to call for an upshift. Under these conditions the shiftable drive control element moves against its blocker but obviously cannot engage until the relative speeds of the engageable drive control elements are synchronized by deceleration of the engine through accelerator releasing movement. Hence, should the operator instead of releasing the accelerator, accidentally or deliberately depress the accelerator to wide open throttle position in demanding further acceleration from the transmission (thus closing the kickdown switch) ignition interruption could occur because the kickdown operation would also vent the servomotor to allow the piston to recede and operate the ignition interrupter switch and even though the shiftable drive control element was not engaged.

This condition has also been found to occur under similar conditions when closing, opening and re-closing of the kickdown switch occurs due to unsteady pedal pressure or because of relative motion between the engine and throttle linkage.

Furthermore, in the arrangement disclosed by Neracher et al. and Syrovy et al., especially where a higher resistor type of ignition harness has been employed, some lurching of the vehicle has been noticeable in vehicle operation during upshifts. It is believed that in a circuiting wherein actuation of the interrupter switch places the ignition primary coil and the solenoid of the control valve in parallel circuits, the solenoid coil acts as a parallel impedance of low value to the primary coil of the ignition and causes the spark delivered by the secondary at the plugs at the time of current flow thereto to be weakened. In this connection, it may be observed that under normal engine operation the higher the engine R. P. M., the lower is the secondary voltage, and since the upshift takes place at a substantial R. P. M. the effect of the low impedance is to weaken the spark sufficiently so that it may be unable to keep the engine running momentarily, as by causing the engine to misfire. This condition can occur, for example, in the Neracher et al. arrangement and in the Syrovy et al. system when the relay coil of the latter has a low impedance effect on the ignition primary.

An object of my invention is to provide an improved ignition interruption control adapted for use, for example, with a transmission control system of the types disclosed in the aforesaid patents and which is capable of operation without accommodating actual ignition interruption or misfiring of the engine during the return i. e., upshift stroke of the piston, and which will positively, so far as now known, limit ignition interruption to only such occasions when it is intended to facilitate relative disengagement of the drive control elements.

Another object is to provide a transmission shift control system having means for interrupting the engine ignition when effecting disengagement of interengaged drive control elements but which system incorporates means associated with the motion transmitting means for the disengageable drive control element for preventing ignition interruption when the drive control elements are not engaged.

It is also an object of the invention to provide a transmission drive control system having means for interrupting the engine ignition when effecting a downshift and which includes means for preventing said interruption of the engine ignition by a driver initiated downshift operation in a vehicle speed range in which an upshift operation has been previously initiated, but not completed to the point of effecting engagement of the drive control elements.

Still another object of the invention is to provide a transmission shift control system having means for interrupting the engine ignition when effecting a downshift, but which system inhibits weakening of the ignition spark intensity during the upshifting operations.

Still another object is to provide a transmission shift control system having means for interrupting the engine ignition when effecting disengagement of the drive control elements, but which system provides safeguards both against weakening of the ignition spark intensity during upshifting and against ignition interruption when a driver downshift operation is initiated in a vehicle speed range accommodating an upshift but which upshift has not been completed.

A specific object of the invention is to provide a transmission control system having means including an ignition interrupting switch for interrupting the engine ignition when effecting disengagement of interengaged drive control elements, one of which elements is a shiftable element, which interruption means includes a control switch and operating means therefor on the motion transmitting means for the shiftable element for preventing ignition interruption during engaging operations of the shiftable element and during a kickdown operation initiated when the shiftable element is not engaged but is against its blocker.

Other objects and features of my invention will be apparent from the following description wherein:

Figure 1 is a diagrammatic plan view of the driving power plant for the vehicle;

Figure 2 is an elevational view partly in section of my invention as applied to a semi-automatic four speed forward and reverse transmission, a part of the control system being schematically illustrated, the manually operable clutch sleeve being shown in its forward or high range position for starting the vehicle from rest, and the power shiftable mechanism and power operable clutch sleeve being shown in the released position of the latter; and Figure 3 is an elevational view similar to a portion of that in Figure 2 and showing the power shiftable clutch sleeve in its direct drive or engaged position and the power shifting mechanism in the corresponding position.

In the drawings in which similar numerals indicate similar parts of the structure, Figure 1 illustrates a typical motor vehicle power plant having a conventional engine A for transmitting power through a propeller shaft 10 to drive the rear ground wheels 11. In the housing B there may be provided a fluid power transmitting device, such as a fluid coupling arranged in tandem with a master friction clutch of known type, the latter being releasable to uncouple the engine from the transmission by operation of a conventional clutch pedal 12. Rearwardly of the housing B is a transmission C which may be any type incorporating positively engageable drive control elements of a character usually subject to substantial thrust or torque load in operation, the latter conditions making the use of some form of unloading means desirable to insure release of the drive control elements when a speed change requiring disengagement of these elements is necessary.

The transmission C may be of various known types. For purposes of illustration I have shown in Figure 2, a commercial form of four-speed and reverse countershaft underdrive transmission. This transmission comprises an input or driving shaft 13 which receives drive from the engine A by way of the clutch assembly B, and an output or driven shaft 14 which is adapted to transmit drive to the propeller shaft 10. The driving shaft 13 carries the main driving gear or pinion 15 and a set of positive jaw clutch teeth 16 which are adapted to be engaged by the teeth of a jaw clutch sleeve D. As will be hereinafter seen, the sleeve D together with the clutch teeth 16 comprise relatively movable drive control elements for effecting stepup and stepdown manipulation of the transmission.

The clutch sleeve D is slidably splined on teeth, not shown, of a forward hub portion of the high or third speed gear 22 which is rotatably journalled on the driven shaft 14 and adapted to be clutched thereto through a jaw clutch sleeve F slidably splined on a hub, not shown, drivingly carried by the shaft 14 and interengageable with jaw clutch teeth 26 carried by the gear 22. The forward shift of sleeve D for clutching with teeth 16 is normally controlled or impeded by a toothed blocker E whereby clutching is limited to synchronous relationship in the speeds of rotation of gears 15 and 22 and, in the particular construction illustrated, limited to engine coast conditions obtainable by accelerator releasing movement to secure deceleration of the engine. The blocker E is journalled on a conical surface, not shown, carried by the shaft 13 against which it is frictionally urged by a spring, also not shown, and has a limited lost motion connection with the sleeve D or gear 22 whereby it may rotate to place its teeth in blocking relation to the teeth of sleeve D whenever the gear 15 rotatably leads or lags the sleeve D. When sleeve D moves past the blocker E into engagement with the clutch teeth 16, the gears 15 and 22 are placed in a two-way direct drive relationship.

Gear 22, as stated above, is loosely journalled on the driven shaft 14 whereas the pinion 15 is part of the input shaft 13. Also loosely journalled on the output shaft 14 is a low or first speed gear 27 having jaw clutch teeth 28 engageable by the sleeve F. Associated with the sleeve F on each side thereof is any commercial type of blocker synchronizers 29 such that clutch F may be shifted from a neutral position disengaged from teeth 26 and 28 forwardly to a high range position to synchronously clutch shaft 14 with the high speed gear 22 through the teeth 26 or rearwardly to a low range position to synchronously clutch shaft 14 with the low speed gear 27 at its teeth 28. Manual shifts of the sleeve F are facilitated by release of the main clutch at B by means of the clutch pedal 12.

Gear 22 is also adapted to be driven from gear 15 at a speed different from 1:1 and to this end I have shown a countershaft type one-way reduction driving means between these gears. This drive comprises the coaxially rotatable countershaft gear 30 and cluster gear 31 wheels 32, 33 respectively, in constant mesh with gears 15, 22, and 27 and an overrunning roller clutch G operably interposed therein between the gear 30 and cluster 31. A stationarily mounted countershaft 34 provides a journal support for the countershaft gears. Assuming the usual clockwise rotation of shaft 13 as viewed when looking from front to rear of Figure 2, then overrunning clutch G will automatically clutch gear 30 and cluster 31 together when gear 30 is driven counterclockwise at a speed tending to exceed that of the cluster 31 and automatically release the drive between these gears to allow gear 30 to slow down below the speed of cluster 31. For obtaining reverse drive an idler gear (not shown) having constant mesh with the gear 33 is shiftable rearwardly into mesh with a gear 35 fixed on shaft 14, the clutch F being then in its neutral position disengaged from teeth 26 and 28.

As thus far described, it will be apparent that with the parts arranged as in Figure 2, sleeve F being then in high range position engaged with teeth 26, drive of shaft 13 will cause the output shaft 14 to be driven at a reduction drive (third speed) through the gears 15, 30 overrunning clutch G, gears 32, 22 and sleeve F. Should the sleeve D be biased forwardly during this reduction drive, blocker E will obstruct sleeve D in an intermediate position of its shift preventing ratcheting of its teeth with the teeth 16. However, if the driver releases the engine throttle control in the form of the usual accelerator pedal then, as will be apparent, overrunning clutch G will allow gear 15 and teeth 16 to slow down relative to the sustained speed of gear 22 and when the speed of gear 15 reaches synchronism with that of gear 22, blocker E will move to an unblocking position and allow sleeve D to move further forwardly to clutch its teeth with teeth 16 to the position shown in Figure 3, to provide the direct drive (fourth speed), clutch G continuing its overrunning operation. Upon return of sleeve D to disengaged position shown in Figure 2, followed by speeding up the engine, overrunning clutch G will automatically engage to restore the reduction drive.

When clutch sleeve F is shifted rearwardly to low range position to clutch gear 27 to shaft 14 an overrunning slow speed drive (first speed) is transmitted from the shaft 13 to the shaft 14 by way of the gears 15, 30, overrunning clutch G, gears 33 and 27 and sleeve F. At such time as the sleeve D is biased forwardly and the shaft 13 is allowed to slow down to permit the teeth 16 to become synchronized with the sleeve D, the sleeve will move past the blocker E and clutch with the teeth 16 to establish a two-way relatively fast speed drive (second speed) in the low range, which drive will be from the shaft 13 through the sleeve D, gears 22 and 32, gears 33 and 27, and clutch F to the shaft 14, the clutch G overrunning by reason of the cluster 31 rotating at a higher speed forwardly than the gear 30.

It will be understood the driver may start the vehicle from rest in the low range drive and subsequently shift to the high range incident to momentary release of the master clutch and this either prior to or subsequent to engagement of the clutch D. Most drivers, however, usually start the vehicle from rest in the slow speed ratio of the high range and at a subsequent higher speed obtain the automatic upshift to direct drive by momentary release of the accelerator pedal described above.

A more complete description of the transmission specifically illustrated in this application and its method of operation is set forth in the patent to A. J. Syrovy et al. 2,490,604 aforesaid.

A speed responsive governor means O is provided to control forward bias of the sleeve D as well as rearward bias thereof as will be presently more apparent. Moreover, during drive in either second or fourth speeds referred to above, a downshift to first or third speeds respectively may be effected by way of overruling the governor O through driver depression of the accelerator pedal M to substantially wide open throttle position, which operation is referred to in greater detail below.

As seen in Figure 2, I have illustrated a servomotor H by which to obtain power actuation of the clutch sleeve D, the motor here illustrated being of the pressure differential and spring operated type and in the disclosed embodiment functioning by means of fluid pressure. This motor preferably comprises a cylinder 36 slidably receiving a piston 37. The piston slidably receives a shift rail or rod 38 mounted to operate in the guideways 39 and 40. Fixed to rod 38 is a yoke 41, a hub portion 42 of which is secured to the rod 38 by means of a dowel screw 43. The rod 38 and yoke 41 constitute motion transmitting means S for the sleeve D, the yoke 41 as seen in Figure 2, having fingers 44 engaging in a groove 45 of the sleeve D to effect shift thereof.

A relatively small preloaded engaging spring 46 surrounds the rod 38 and is disposed between the hub of piston 37 and the hub 42 of the yoke 41. This spring 46 provides a lost motion thrust transmitting connection between the piston 37 and the hub 42 of the motion transmitting means S such that the piston 37 may be moved forwardly (to the left in Figure 2) for its power stroke, the piston 37 continuing its forward motion by fluid pressure even after the clutch D has been moved against the blocker E until the lip 47 of the piston uncovers the relief port 48 of the cylinder 36 whereupon forward movement of the piston 37 will cease, the fluid pressure being then expended through the relief port 48.

During the said forward movement of the piston 37 the engaging spring 46 is compressed and urges the rail 38 through the hub 42 of the yoke 41 forwardly thus in turn shifting the clutch sleeve D to its intermediate position blocked by the blocker E. Subsequently upon synchronous rotation of the teeth 16 and sleeve D being obtained in response to accelerator releasing movement, the sleeve D is moved through the blocker E into engagement with the teeth 16 of the drive pinion 15, which is its fully engaged upshifted position shown in Figure 3, establishing the previously described direct drive between the shaft 13 and gear 22.

A relatively large preloaded downshift or kickdown spring 49 is disposed between an abutment ring 50, located at the forward end of the cylinder 36, and the piston 37. This spring serves to return the piston 37 and sleeve D from their Figure 3 positions to their downshifted or disengaged position shown in Figure 2. It will be observed from Figure 3 that the piston 37 when in its furthest forward position shown in this figure uncovering the port 48 has moved further than the shift rail 38 such that a gap 51 is created between the piston 37 and a shoulder 52 of the portion 53 of the shift rail. This gap 51 facilitates a lost motion movement of the piston 37 relative to the shift rail 38 prior to disengaging movement of the sleeve D which can only commence following abutment of the piston 37 with the shoulder 52. As previously noted, forward movement of the piston 37 is stopped upon uncovering the port 48, the latter permitting any excess pressure required to hold the piston 37 in its furthest position to be relieved and preventing the building up of such excess pressure in the cylinder.

The pressure fluid supply system is shown in Figure 2 and comprises a suitable supply source 60, which is usually the transmission sump. A pump Q of the rotary gear type is mounted on the shaft 14 and has its rotor 61 driven by that shaft, oil being drawn from the supply source 60 through the conduit 62 to the pump inlet 63 and is delivered under pressure at the pump outlet 64 to the conduit 65 and then to the passage 66 under control of a ball valve K. A relief valve, generally designated by the numeral 67 and provided at the pressure side of the pump between the outlet 64 and the ball valve K serves as a relief valve in the event the valve K is not open in normal operation of the transmission to thereby permit pressure fluid trapped behind the piston 37 to be dumped back into the transmission sump 60 through the conduit 67a.

When the valve K is closed, oil under pressure is forced directly from the pump through the passage 66 to the cylinder 36 where it moves the piston 37 forwardly to effect forward movement of the shift rail 38 in the manner described above whereby the shift sleeve D is operated from its disengaged position in Figure 2 to its engaged position of Figure 3 to establish second or fourth speed ratio drive depending upon whether the clutch F is engaged with the first speed gear 27 or with the third speed gear 22.

Valve K is closed by bias of a valve spring 68 acting against a ball 69 to close a discharge port 70 opening into a passage 71 draining to the sump or supply source 60. The valve K is actuated to its open position under control of an electromagnetic device comprising a solenoid L having a plunger 72 connected with the movable core of the solenoid. The valve K is closed when the solenoid L is deenergized. The spring 68 then actuates the ball 69 against a seat 73 to close the port 70 and effects movement of the solenoid plunger 72 to its retracted position. The valve K is open when the solenoid L is energized, the solenoid core then moving the plunger 72 downwardly to push the ball 69 off the seat 73 of port 70. The oil may now flow from the pump Q through the conduit 65, port 70, passage 71, back to the sump 60.

When the valve K is open, it is impossible for sufficient fluid pressure to develop in the passage 66 to move the piston 37 against the force exerted by the piston return spring 49 which then maintains the piston at the extreme rearward position of its capable movement. Hence the piston 37 is actuated by fluid pressure only to establish second and fourth speeds respectively at which time the valve K is closed and the solenoid L deenergized. Figure 2 shows the valve K in its open position and the piston 37 in its position retracted by spring 49, and Figure 3 shows the valve K in its closed position and the piston 37 in its furthest forward position under control of the pressure fluid.

Energization and deenergization of the solenoid

L is brought about by operation from one position to another of either of two control members, one actuated in response to vehicle speed, and the other in response to manipulation by a driver control member. One of these control members is the governor O, and the other is a kickdown switch generally designated by the letter P. Suitable electrical circuit means are provided for effectuating the control operation of the governor and kickdown switch over the solenoid L. Thus a suitable source of electrical energy, for example, a storage battery 75 has one side grounded as at 76 by a conductor 77 and its other side connected by a conductor 78 through an ammeter 79 to the ignition switch 80. A conductor 81 connects the ignition switch with one terminal 82 of the solenoid L, the other terminal 83 of the solenoid being connected by a conductor 84 with a terminal 85 of a switch generally designated by the letter N which is operated by the governor O and which has a second terminal 87 connected to a ground 88 by a conductor 89. From the governor switch terminal 85 a conductor 90 extends to a terminal 91 of the kickdown snap switch P, this switch having a second terminal 92 connected to a ground 93 by a conductor 94.

The governor switch N is closed by a movable conductor switch bar 95 operated by an insulated sliding sleeve 96 of the governor O, the switch being closed when the bar 95 bridges the terminals 85 and 87. The kickdown switch P is of the snap type and has a conductor bar 97 which closes the same by bridging the terminals 91 and 92 of this switch.

Thus by means of the governor switch N and the kickdown switch P, two parallel ground circuits are provided for the solenoid L, the governor switch N opening at a speed proportional to vehicle speed established by the drive connection 100, 101 between the governor O and the countershaft cluster 31. It will be understood that the governor driving means 101 may if desired be on the driven shaft 14.

The kickdown switch P, as shown in Figure 2, is in open position under control of a coil spring 102 and which biases the accelerator M to its released position.

The accelerator M is suitably connected with the usual engine carburetor throttle valve by means including linkage 103, 104 which serves to open and close the throttle valve. Interposed in the throttle valve operating linkage is a lever 105 pivotally supported at 106 and having spaced fingers or projections 108, 110 for operating the actuating finger 112 of the snap switch P. The mechanism is preferably arranged such that in operation, the switch finger 112 is engaged by the lever projection 108 as the throttle valve in response to depression of the accelerator M approaches its full open throttle position, so that the switch P is closed with snap action during approximately the last 5° or so of throttle opening movement. It will be understood that the operation of this switch may be adjusted to occur subsequent to full open throttle position by the provision of suitable lost motion mechanism such as disclosed in the patent to Neracher et al. 2,455,943. When the accelerator M is released, the finger 110 comes into contact with the actuating finger 112 of the switch near the fully released position of the accelerator to actuate the switch P to its open position, again by snap action, the parts being so arranged that the switch P will be opened by finger 110 whenever the accelerator pedal is fully released.

The ignition mechanism, generally designated by the letter J, is of conventional type and includes an ignition coil 120, a distributor 121, and a breaker 122. The coil 120 includes a primary winding 123 and a secondary winding 124. Grounding of the ignition is provided by a circuit including a conventional normally open interruption switch T whose operating ball 125 projects into the cylinder 36 and is operated by cams 126 and 127 of the piston 37 in its movement between clutch engaging and disengaging positions, as will hereinafter be explained.

As noted above, by prior control circuits and structures, it was possible to cause ignition interruption to occur when not desired, during an uncompleted upshift, through accidental or deliberate operation of the kickdown switch P by the operator acting upon the accelerator M, and in systems providing a common ground for the ignition primary winding and the solenoid L in parallel arranged circuits, it was possible for the solenoid L to act as a parallel impedance of low value to the primary coil 123 to weaken the spark delivered by the secondary coil 124 at the spark plugs 129 when current flow thereto took place.

A feature of the present invention is to overcome these difficulties. In order to accomplish this I preferably provide in the ignition grounding circuit a second, normally closed, interruption control switch Y mounted on the transmission casing wall 131 forwardly of the motor H. The spring biased plunger 132 of the switch Y projects inwardly of the casing and is adapted to be actuated by a cam headed radial abutment or projection member 133 mounted on the motion transmitting means S, and preferably threadably received in the hub 42 of the clutch sleeve yoke 41 and radially adjustable thereon in relation to the switch plunger 132. The head of the switch actuating member is of sufficient width to effect operation of the switch from a normally closed position when the clutch sleeve D is engaged to its open position when the sleeve D is disengaged, the switch being maintained in open position during all positions of the sleeve between its fully retracted (disengaged) position and its blocked position, and operation of the switch to establish its closed position commencing with movement of the sleeve D through the blocker E.

Conductors 134, 135, 136 connect the primary winding 123 with the terminal 137 of the switch Y whose second terminal 138 is connected by a conductor 139 with terminal 140 of the switch T whose second terminal 142 is connected by a conductor 144 with the terminal 85 of the switch N operated by the governor O which, when closed, provides a ground 88 or by the conductors 144 and 90 with the kickdown switch P which, when closed, provides a ground 93.

The operation of the transmission and control system will now be described. Let it be assumed that the vehicle is at a standstill, with the manual sleeve F shifted forwardly in engagement with the teeth 26 of the third speed gear 22, as seen in Figure 2. At this time the governor switch N will be closed and provides a circuit from the battery 75 to ground 88 by way of the conductors 81 and 84 and solenoid L, thus energizing the latter whereby the solenoid rod 72 maintains the ball 69 of the valve K in its down position venting the motor H so that spring 49 holds the clutch sleeve D in the position shown in this figure. The interrupter switch T is open, as shown, the ball operator 125 being free of the lip 47 of the piston 37 and the interrupter switch control switch Y being closed since in the position shown the operating member 132 of this switch is held in raised position closing the switch by the abutment member 133 of the shift yoke 41 for the sleeve D. The kickdown switch P is open since the accelerator pedal M is in released position.

By depressing the accelerator pedal the vehicle is driven in third speed ratio drive and at some predetermined speed of vehicle travel, for example, 12 to 14 M. P. H. (6 to 7 M. P. H. in first speed) the governor O actuates the switch N to open position. This action deenergizes the solenoid L and the valve K is thereupon closed by operation of the spring 68 which moves the ball 69 to close the port 70 at the entrance of the return passage 71, thus permitting pressure to be built up by the pump Q in the passage 66.

When the fluid pressure builds up sufficiently, the piston 37 moves forwardly for its upshift stroke and comes to rest at the position shown in Figure 3 where the relief port 48 is uncovered to relieve the fluid pressure and maintain the piston at this position. The forward movement of the piston 37 is utilized in compressing the springs 46 and 49. Initially the spring 46 moves the sleeve D through the yoke 41 of the motion transmitting means S to its blocked position against the blocker E, these parts thereupon coming to a temporary rest. Then lost motion movement occurs between the piston 37 and the means S during which the springs 46 and 49 continue to compress until the piston uncovers the relief port 48, as seen in Figure 3.

During this forward movement of the motion transmitting means S and the piston 37 of the switch Y is held open by the abutment member 133 and the switch K is first closed by the cam 126 of the piston and held closed momentarily by the lip 47 and then permitted to reopen by the cam 127.

There is no grounding of the ignition since both switches N and Y are open.

Thereafter upon accelerator release, to synchronize the speeds of the sleeve D and the clutch teeth 16, the sleeve D is moved by spring 46 acting upon the yoke 41 of the motion transmitting means S, to its engaged position seen in Figure 3, the rail or rod 38 moving with the yoke 41 to the position shown in this figure. The transmission is now established in fourth speed.

During movement of the sleeve D through the blocker E, the yoke abutment member 132 begins to move away from the operating plunger 132 of the switch Y and the switch is in its normally closed position by the time the teeth of the clutch sleeve D enter into engagement with the clutch teeth 16.

It is to be noted that because the switch Y is maintained open until the sleeve D enters the teeth 16 should the operator either accidentally or deliberately depress the accelerator pedal M to full open position of the throttle at a time when the governor switch N is open and the sleeve D is against the blocker E the switch P will be closed and solenoid L energized to vent the motor H permitting the piston 37 to momentarily close the normally open switch T in its rearward movement, but the ignition coil 123 will not be grounded because during this entire operation the switch Y which is in series with the switch T and coil 123 is in open position. Moreover, it will be noted that by reason of the switch Y closing only when the sleeve D enters into engagement with teeth 16 and the switch T is momentarily closed and again reopened prior to closing of switch Y, during the upshift operation, no weakening of the ignition can occur in the manner described above because it is impossible to provide a common ground for the ignition primary coil 123 and the solenoid L.

Once the clutch sleeve D is established in fourth speed, a downshift to third speed is effected either by manually closing the kickdown switch P through depression of the accelerator to substantially full open position of the throttle or by the automatic closing of the governor switch N when the speed of the vehicle drops below the upshift speed set for the transmission.

For example, when the driver desires to manually effect the downshift from fourth speed he may fully depress the accelerator M. During this operation the switch P is closed. Since at this time the engine is delivering its full power, it is desirable to effect torque relief at the teeth 16 to facilitate the release of sleeve D for the downshift. Moreover, at this time the switch Y is in its Figure 3 closed position. Hence when the switch P is closed, ground 88 is applied to the solenoid L circuit from the battery 75 causing energization of the solenoid and opening of the valve K to vent the motor H. Venting of the motor H permits return movement of the piston 37 to start under urging of the spring 49, it taking up the gap 51 previously established during lost motion movement between the piston 37 and rail 38 and coming to rest against the shoulder 52 of the rail 38. During this movement the piston cam 127 acts on the ball 125 of switch T to close this switch and the lip 47 keeps the switch T momentarily closed.

Until the switch T is closed the sleeve D usually remains engaged with the clutch teeth 16 by reason of the torque on its teeth, and the switch Y is therefore closed. Hence when the switch T is closed by the piston 37, the switches Y and P being then also closed, a ground circuit is established between the primary coil 123 and ground 93 of the switch P, grounding the ignition. The engine now missing fire, unloads the torque on the teeth of clutch 16 and the teeth of the sleeve D and permits disengagement of the sleeve D, whereupon the piston 37 completes its rearward or return stroke back to the position illustrated in Figure 2 together with the rail 38 and the abutment member 133 again engages the plunger 132 of the switch Y as seen in Figure 1 to again hold this switch open.

It will be understood that the ignition is restored to normal operation as soon as the cam 126 of the piston leaves the ball 125 of the switch T permitting the latter to be restored to open position.

When the accelerator M is later released sufficiently to open switch P, fourth speed may be again restored as previously described, provided the vehicle speed is still such that the governor switch N is open.

For automatic downshift from fourth to third speed under control of the vehicle governor O, it is only necessary to reduce the vehicle speed to or below the speed at which the governor switch N normally closes. Such action effects closing of switch N and establishment of a circuit between battery 75 and ground 88 through the solenoid L which is then energized. The motor H is now vented as described above with respect to downshift by kickdown operation and the switches T and Y are operated as there described.

When the sleeve F is in its rearward or low range position, then upshift and downshift movement of sleeve D will be the same as that set forth for operation of this sleeve in the high range setting. However, since the governor O is driven from the countershaft as at 101 in Figure 2, the governor O will function at a somewhat lower car speed depending on the gear ratios for first and second as compared with third and fourth as will be readily understood.

From the foregoing description of my invention, it will be apparent that I have provided a novel and foolproof ignition interrupter control system and structure for transmissions having both governor and manually controlled downshifting wherein ignition interruption for disengaging engaged clutch elements is initiated at required times only.

It will also be apparent that the invention is applicable to other forms of transmissions. Moreover, although the disclosed embodiment of the invention is well adapted for carrying out the objects hereinabove set forth, it will be understood that various modifications, changes, and substitutions coming within the spirit of my invention and within the scope of the appended claims are also contemplated.

What is claimed is:

1. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable control element, actuating means operable upon said motion transmitting means for effecting shift of said shiftable drive control element between its two said positions by said motion transmitting means, and circuit means including a pair of series arranged switches for controlling interruption of the ignition system, one of said switches being operable by said motion transmitting means and the other of said switches being operable by said actuating means.

2. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable control element, actuating means operable upon said motion transmitting means for effecting shift of said shiftable drive control element between its two said positions by said motion transmitting means, and circuit means including a pair of series arranged interrupter and a ground applying switch for controlling the ignition system, one of said switches being operable by said motion transmitting means and the other of said pair of switches being operable by said actuating means.

3. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable control element, actuating means operable upon said motion transmitting means for effective shift of said shiftable drive control element between its two said positions by said motion transmitting means, and circuit means including a pair of series arranged switches for controlling interruption of the ignition system, one of said switches being a nomally closed switch operable by said motion transmitting means and the other of said switches being a normally open switch operable by said actuating means.

4. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable control element, actuating means operable upon said motion transmitting means for effecting shift of said shiftable drive control element between its two said positions by said motion transmitting means, circuit means including a pair of series arranged switches for controlling interruption of the ignition system, one of said switches being a normally closed switch and the other a normally open switch, switch operating means on said motion transmitting means movable relative to said one switch for effecting conditioning thereof in open position when said shiftable drive control element is in said first position and for effecting conditioning thereof in closed position when said shiftable element is in said second position, and switch operating means on said actuating means movable relative to said other switch for effecting conditioning thereof in closed position when said first switch is closed and for effecting conditioning thereof in open position as an incident to disengaging movement of said shiftable control element.

5. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable control element, actuating means operable upon said motion transmitting means for effecting shift of said shiftable drive control element between its two said positions by said motion transmitting means, circuit means including a pair of series arranged switches for controlling interruption of the ignition system, one of said switches being a normally closed switch and the other a normally open switch, first switch operating means on said motion transmitting means, second switch operating means on said actuating means, said one switch and said first switch operating means being relatively movable for effecting conditioning of said one switch in open position when said shiftable drive control element is in said first position and for effecting conditioning thereof in closed position when said shiftable element is in said second position, and said second switch and said second operating means being relatively movable for effecting conditioning of said second switch in closed position as an incident to operation of said actuating means for effecting shift of said shiftable element out of said second position when said first switch is closed and for effecting conditioning thereof in open position as an incident to disengaging movement of said shiftable control element.

6. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means including a yoke member movable for shifting said shiftable control element, actuating means including a differential pressure actuated piston operable upon said motion transmitting means for effecting shift of said shiftable drive control element between its two said positions by said motion transmitting means, and circuit means including a pair of series arranged switches for controlling interruption of the ignition system, one of said switches being operable by said yoke member, and the other of said pair of switches being operable by said piston.

7. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means including a yoke member movable for shifting said shiftable control element, actuating means including a differential pressure actuated piston operable upon said motion transmitting means for effecting shift of said shiftable drive control element between its two said positions by said motion transmitting means, circuit means including a pair of series arranged switches for controlling interruption of the ignition system, adjustable cam means on said yoke for operating one of said switches, cam means on said piston for operating the other of said pair of switches.

8. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means including a yoke member movable for shifting said shiftable control element, actuating means including a differential pressure actuated piston operable upon said motion transmitting means for effecting shift of said shiftable drive control element between its two said positions by said motion transmitting means, circuit means including a pair of series arranged switches for controlling interruption of the ignition system, one of said switches being a normally closed switch and the other being a normally open switch, abutment means carried by said yoke and movable therewith for operating said one switch, said abutment means conditioning said one switch in open condition in its position corresponding to said first position of said shiftable control element and in substantially all other positions thereof excepting that corresponding to said second position of said shiftable control element, and cam means carried by said piston for momentarily operating said other switch from its open to its closed position during movement of said piston for effecting shift of said shiftable control element between said first and second positions and during at least a part of that movement of said piston for effecting shift of said shiftable control element between said second and first positions corresponding to movement of said yoke abutment between closed and open positions of said one switch.

9. In a power transmission for driving a vehicle having an engine provided with an ignition system; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means including a yoke member movable for shifting said shiftable control element, actuating means including a differential pressure actuated piston operable upon said motion transmitting means for effecting shift of said shiftable drive control element between its two said positions by said motion transmitting means, circuit means including an igintion primary coil, an ignition interrupting switch, a control switch for said interrupting switch, a solenoid controlled valve for controlling actuation of said piston, a speed responsive ground switch and an accelerator operable ground switch, said control switch being a normally closed switch and said other switches being normally open, means carried by said yoke member for operating said control switch to open the same when effecting engagement of said drive control elements but facilitating closing of said control switch when effecting disengagement of said drive control elements such that said control switch is closed whenever said drive control elements are disengaged, and cam means on said piston operable during operation of said piston for effecting disengagement of said shiftable drive control element and only when said control switch and one of said governor or accelerator switches are closed, for closing said interrupter switch to apply a ground to said primary coil to interrupt the ignition and facilitate disengagement of said drive control elements.

LOUIS B. FORMAN.

No references cited.